UNITED STATES PATENT OFFICE.

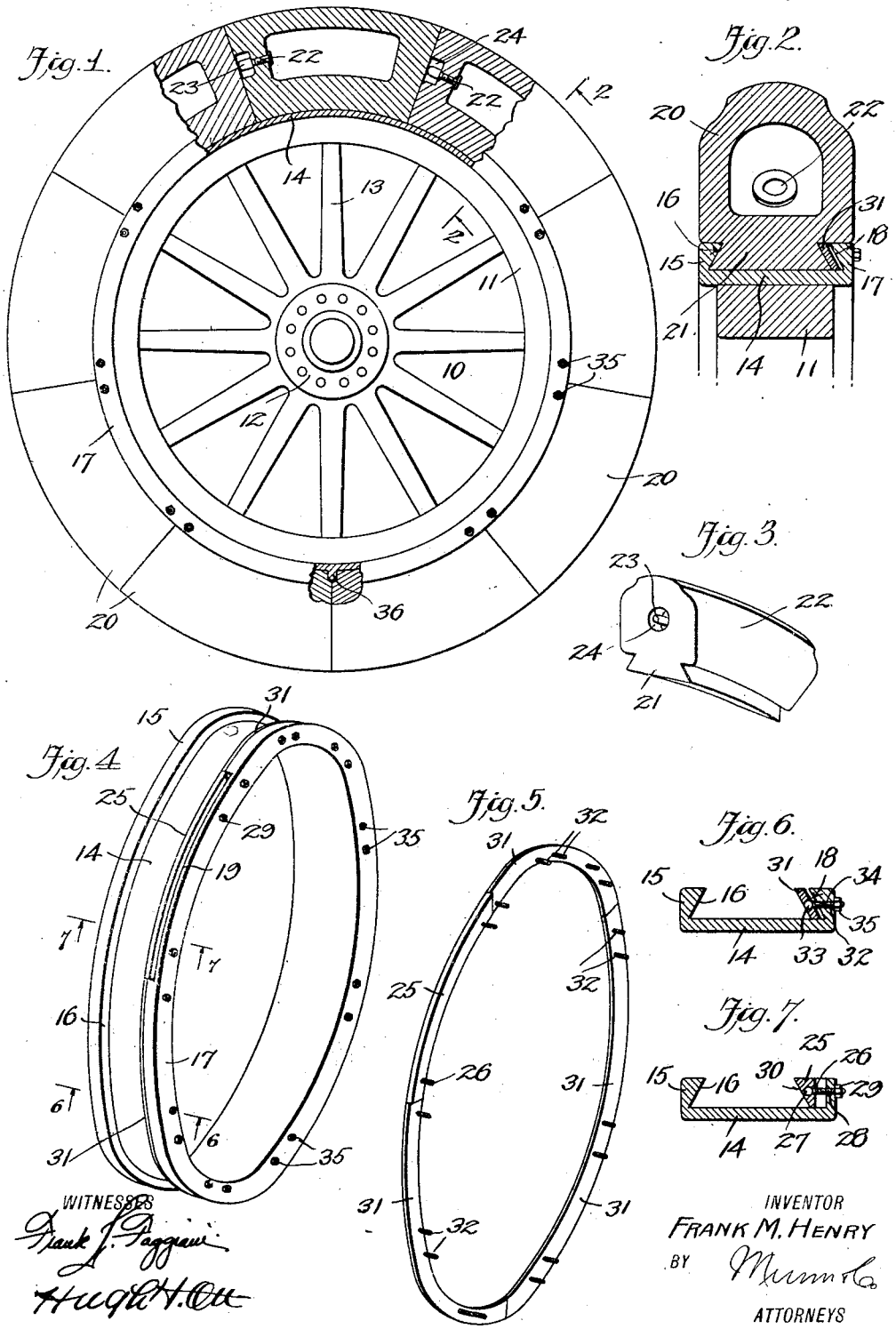

FRANK M. HENRY, OF VINELAND, NEW JERSEY.

VEHICLE TIRE AND RIM.

1,371,167.  Specification of Letters Patent.  Patented Mar. 8, 1921.

Application filed October 5, 1920. Serial No. 414,815.

*To all whom it may concern:*

Be it known that I, FRANK M. HENRY, a citizen of the United States, and a resident of Vineland, in the county of Cumberland and State of New Jersey, have invented a new and Improved Vehicle Tire and Rim, of which the following is a full, clear, and exact description.

This invention relates to a vehicle tire and rim structure especially designed for automobile or motor vehicles, the same being in the nature of an improvement over a similar invention, of which Letters Patent of the United States have been granted to me under the date of November 28th, 1911, and which bear Patent #1,010,258.

One of the principal objections and disadvantages of my prior device, was the tendency of the tire sections to stick to the rim after their continued use and it is therefore an object of this invention to provide means for loosening the tire sections when it is desired to remove the same.

Another object in view is to improve and simplify the means to permit of the insertion and removal of the tire sections on the rim.

A further object of the invention is to improve and simplify the construction of the tire sections without detracting from the advantages of the same or adding to the expense of manufacture.

With the above recited and other objects in view, some of which will appear hereafter, reference is had to the following specification, the appended claims and the accompanying drawings forming a part of this application, in which:

Figure 1 is a side elevation of a vehicle wheel equipped with the improved rim and tire structure, parts thereof being broken away to disclose the underlying elements.

Fig. 2 is a cross sectional view through the tire, rim and felly taken approximately on the line 2—2 of Fig. 1.

Fig. 3 is a detail perspective view of one of the tire sections removed from the rim.

Fig. 4 is a perspective view of the rim with the tire engaging means in applied position.

Fig. 5 is a perspective view of a tire engaging means removed.

Fig. 6 is a detail cross sectional view taken approximately on the line 6—6 of Fig. 4.

Fig. 7 is a similar view taken on the line 7—7 of Fig. 4.

Referring to the drawings by characters of reference, 10 designates a vehicle wheel provided with the usual felly 11 connected to the hub 12 by means of the spokes 13.

The rim constituting a part of this invention includes an annular base 14, having an inner peripheral flange 15 provided with an inner beveled wall 16, which is inclined inwardly from its point of juncture with the base to the free edge of the flange. The opposite side of the base 14 is provided with a peripheral flange 17 having an inner beveled wall 18 which is inclined inwardly from its point of juncture with the base 14 to the free edge of the flange. The inner beveled portion of the flange 17 is cut away as at 19 to provide a recess for a purpose to be hereinafter set forth. The tire also forming a part of this invention and adapted to be used in connection with the hereinbefore described rim includes a plurality of identically constructed sections 20, each of which is of segmental formation and is provided with a dove-tail base 21. Each tire section is hollow and is provided with a valve 22 for establishing communication to the interior thereof whereby the same may be inflated to obtain a proper cushioning effect. The exposed portion of the valve stem 23 lies within a recess 24 in the end of each tire section as clearly illustrated in Fig. 1 of the drawings. Arranged within the cut away or recessed portion 19 of the flange 17 is a transversely slidable arcuate block 25 which corresponds in length and shape to the cut away portion. A plurality of threaded stems 26 are swiveled as at 27 at their inner ends within the block 25 and are operatively extended through the threaded openings 28 in the flange 17, the exposed portions of said stems being adapted to receive the lock nuts 29. By this arrangement the block 25 is slidable transversely of the rim and is relatively adjustable with respect to the flange 17 whereby its inner beveled surface 30 may be engaged with or disengaged from one of the beveled side faces of the base 21 of a tire section 20. A plurality of arcuate strips 31 are arranged adjacent to the inner beveled wall 18 of the remainder of the flange 17 and are relatively adjustable with respect thereto by means of the threaded stems 32 which are swiveled at their inner end to the strips 31 as at 33 and extend through the threaded openings 34 in the flange 17. The outer extremity thereof is adapted to receive a lock nut 35 for securing the same in its adjusted position. The strips 31 are disposed at an angle with respect to the base and are parallel to the beveled wall 18.

In use of the device the tire sections are singly applied to the rim by retracting the block 25, inserting one of the beveled edges of the base under the flange 15 at the cut away portion 19. The section thus applied is moved around the rim until it contacts with the stop lug 36 projecting radially from the base at a point opposite to the cut away portion. The remaining sections are applied in a similar manner until the rim is entirely filled. The strips 31 and block 25 are then advanced against the opposite beveled face of the base 21 to frictionally retain the sections in place. When it is desired to remove one or more of the sections, the block 25 and the necessary strips 31 are retracted against the flange 17 to loosen the same from engagement with the base. The sections may then be removed through the cut away portion and the new ones inserted to replace those that are punctured or otherwise damaged.

From the foregoing it will be seen that a simple and improved construction of a tire and rim is provided in which the sections thereof may be readily removed, the adjustable strips serving to prevent sticking of the parts of the tire sections to the rim and the block affording a simple means for effecting the removal or application of the sections.

It is to be understood that the right is reserved to embodiments other than those actually illustrated herein, to the full extent indicated by the general meaning of the terms in which the claims are expressed and by variations in the phraseology of the same.

Having thus described my invention, I claim as new and desire to secure by Letters Patent:

1. The combination with a tire including a plurality of sections each having a dovetailed base, a rim having peripheral flanges provided with beveled inner faces constituting a circumferential groove adapted to receive and co-act with the dove-tail bases to retain the tire sections in associated relation with respect to the rim, of means to permit of the removal and insertion of the tire sections singly comprising a recessed portion in one of the side flanges corresponding to the length of a tire section base, and an arcuate block respectively adjustable in said recess for completing the groove to prevent removal of the tire sections or for exposing the recess to permit of the insertion of said tire sections.

2. The combination with a tire including a plurality of sections each having a dovetailed base, a rim having peripheral flanges provided with beveled inner faces constituting a circumferential groove adapted to receive and co-act with the dove-tailed bases to retain the tire sections in associated relation with respect to the rim, of means to permit of the removal and insertion of the tire sections singly comprising a recessed portion in one of the side flanges corresponding to the length of a tire section base, an arcuate block respectively adjustable in said recess for completing the groove and clamping the tire section arranged therein to prevent the removal of the same and the remaining tire sections, or for releasing said tire section and exposing the recess to permit of the insertion or removal of the tire sections, and adjustable means for clamping or releasing the remaining tire sections when positioned in the groove.

3. The combination with a tire including a plurality of sections each having a dovetailed base, of a rim having peripheral flanges provided with beveled inner faces constituting a circumferential groove of increasing width inward, a recess in the inner wall of one of the flanges and a laterally adjustable member in said recess relative to said wall to permit of the insertion or removal of the dove-tailed bases of the tire sections and serving to maintain the same in the groove.

4. The combination with a tire including a plurality of sections each having a dovetailed base, of a rim having peripheral flanges provided with beveled inner faces constituting a circumferential groove of increasing width inward, a recess in the inner wall of one of the flanges and a laterally adjustable member in said recess relative to said wall to permit of the insertion or removal of the dove-tailed bases of the tire sections and serving to maintain the same in the groove, and means in the remainder of the groove for clamping or releasing the tire sections, as and for the purpose specified.

FRANK M. HENRY.